US012664304B2

(12) United States Patent
Qiao

(10) Patent No.: US 12,664,304 B2
(45) Date of Patent: Jun. 23, 2026

(54) METHOD, APPARATUS, AND STORAGE MEDIUM FOR DIGITAL CAR KEY REGISTRATION

(71) Applicant: Beijing Xiaomi Mobile Software Co., Ltd., Beijing (CN)

(72) Inventor: Guangjun Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/714,327

(22) PCT Filed: Apr. 29, 2022

(86) PCT No.: PCT/CN2022/090553
§ 371 (c)(1),
(2) Date: May 29, 2024

(87) PCT Pub. No.: WO2023/097964
PCT Pub. Date: Jun. 8, 2023

(65) Prior Publication Data
US 2025/0028858 A1     Jan. 23, 2025

(30) Foreign Application Priority Data
Nov. 30, 2021     (CN) .......................... 202111444147.6

(51) Int. Cl.
*G06F 21/62*     (2013.01)
*B60R 25/24*     (2013.01)
(52) U.S. Cl.
CPC .......... *G06F 21/6245* (2013.01); *B60R 25/24* (2013.01)

(58) Field of Classification Search
CPC ... G06F 21/6245; G06F 21/602; B60R 25/24; H04L 2209/805; H04L 9/0866; H04L 2209/84; H04L 63/08; H04L 9/40; H04L 67/12; G07C 9/00571
See application file for complete search history.

(56) References Cited

U.S. PATENT DOCUMENTS

| | | | |
|---|---|---|---|
| 10,589,719 B1 | 3/2020 | Sohn et al. | |
| 11,139,984 B2 * | 10/2021 | Cole ................... | G06F 21/6245 |
| 2016/0267730 A1 * | 9/2016 | Wadhwani ......... | G07C 9/00309 |
| 2017/0104589 A1 * | 4/2017 | Lambert ............... | H04L 9/3268 |
| 2017/0352210 A1 * | 12/2017 | Maiwand ........... | G07C 9/00571 |
| 2018/0343110 A1 * | 11/2018 | Funk ..................... | H04L 9/0838 |
| 2019/0028443 A1 * | 1/2019 | Chin ..................... | H04W 12/06 |

(Continued)

FOREIGN PATENT DOCUMENTS

| | | |
|---|---|---|
| CN | 107685714 A | 2/2018 |
| CN | 112614251 A | 4/2021 |

(Continued)

OTHER PUBLICATIONS

Extended European Search Report dated Feb. 6, 2025 for European Patent Application No. 22899787.0.

*Primary Examiner* — Javier O Guzman
(74) *Attorney, Agent, or Firm* — Volpe Koenig

(57) ABSTRACT
A digital car key registration method, performed by a terminal and includes: sending, to a server, a registration request for requesting the registration of a digital car key, where the registration request includes a user identity of the digital car key, and the user identity is generated on the basis of a car owner account identity and car information.

18 Claims, 5 Drawing Sheets

Send, to a vehicle manufacturer's server, a registration request for requesting a registration of a digital car key, where the registration request includes a user identity generated on the basis of a car owner account identity and car information

S11

(56)                    References Cited

U.S. PATENT DOCUMENTS

| | | | |
|---|---|---|---|
| 2019/0122470 A1 | 4/2019 | Endo et al. | |
| 2021/0111871 A1* | 4/2021 | Chin ....................... | H04W 4/44 |
| 2021/0232704 A1* | 7/2021 | Lim .................... | G06F 21/6254 |
| 2021/0271743 A1* | 9/2021 | Jung ........................ | G06F 21/33 |
| 2022/0166769 A1* | 5/2022 | Kwon ................. | H04L 63/0807 |
| 2022/0417359 A1* | 12/2022 | Tokuyama ............... | H04Q 9/00 |
| 2023/0133441 A1* | 5/2023 | Cosentino ............... | B60R 25/33 |
| | | | 340/5.72 |

FOREIGN PATENT DOCUMENTS

| | | | |
|---|---|---|---|
| GB | 2465320 A | 5/2010 | |
| KR | 1020190032035 A | 3/2019 | |
| WO | 2020/174544 A1 | 9/2020 | |
| WO | WO-2022005434 A1 * | 1/2022 | ......... G06Q 20/3829 |

\* cited by examiner

100

200

METHOD, APPARATUS, AND STORAGE MEDIUM FOR DIGITAL CAR KEY REGISTRATION

CROSS REFERENCE TO RELATED APPLICATION

The present application is a National Stage of International Application No. PCT/CN2022/090553, filed on Apr. 29, 2022, the contents of all of which are incorporated herein by reference in their entirety for all purposes.

BACKGROUND OF THE INVENTION

The development of Internet technology is promoting a technological revolution of social informatization, and people's lifestyle also changes with the development of Internet technology. With the development of automotive electronic technology and the increasing needs of users, functions achieved by an interaction between cars and intelligent terminals, such as smartphones, are also becoming more and more intelligent, such as a digital car key.

SUMMARY OF THE INVENTION

The disclosure relates to the technical field of intelligent devices, in particular to a method, apparatus, and storage medium for digital car key registration.

In order to overcome problems in the related technology, the disclosure provides a digital car key registration method and apparatus, and a storage medium.

According to a first aspect of an example of the disclosure, a digital car key registration method is provided, the method is performed by a terminal, and the method includes: sending, to a server, a registration request for requesting a registration of a digital car key, where the registration request includes a user identity, and the user identity is generated on the basis of a car owner account identity and car information.

According to a second aspect of an example of the disclosure, a digital car key registration method is provided, the method is performed by a server, and the method includes: acquiring a digital car key registration request sent by a terminal, where the registration request includes a user identity, and the user identity is generated on the basis of a user account identity and car information; and registering a digital car key.

According to a third aspect of an example of the disclosure, a digital car key registration apparatus is provided and includes: a processor; and a memory configured to store an instruction executable by the processor; where the processor is configured to execute the first aspect or the digital car key registration method in any one implementation mode of the first aspect.

According to a fourth aspect of an example of the disclosure, a digital car key registration apparatus is provided and includes: a processor; and a memory configured to store an instruction executable by the processor; where the processor is configured to execute the second aspect or the digital car key registration method in any one implementation mode of the second aspect.

According to a fifth aspect of an example of the disclosure, a storage medium is provided, the storage medium stores an instruction, and a terminal is able to execute the first aspect or a digital car key control method in any one implementation mode of the first aspect when the instruction in the storage medium is executed by a processor of the terminal.

According to a sixth aspect of an example of the disclosure, a storage medium is provided, the storage medium stores an instruction, and a server is made to be able to execute the second aspect or a digital car key control method in any one implementation mode of the second aspect when the instruction in the storage medium is executed by the server.

According to a seventh aspect of an example of the disclosure, a computer program is provided and includes a computer-readable code. When the computer-readable code runs on a computational processing device, the computational processing device is caused to execute the first aspect or the digital car key registration method in any one implementation mode of the second aspect.

It shall be understood that general descriptions above and detailed descriptions below are merely exemplary and explanatory and cannot limit the disclosure.

BRIEF DESCRIPTION OF DRAWINGS

Accompanying drawings here are incorporated into and form part of the specification, show examples that comply with the disclosure, and are used together with the specification to explain the principles of the disclosure.

DETAILED DESCRIPTION OF THE INVENTION

Figure 1:
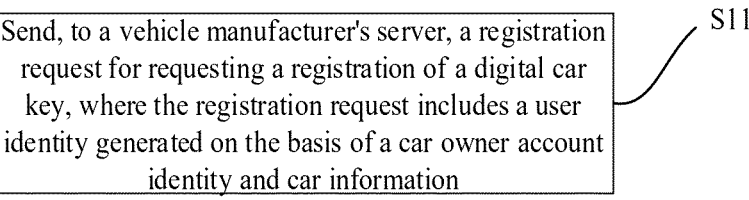
FIG. 1 is a flow diagram of a digital car key registration method shown according to an example.

Examples will be illustrated in detail here, instances of which are shown in the accompanying drawings. When the description below relates to the accompanying drawings, the same numbers in different accompanying drawings represent the same or similar elements unless otherwise indicated. Implementation modes described in the following examples do not represent all implementation modes consistent with the disclosure.

A digital car key registration method provided in an example of the disclosure is applied to a scenario of cross-manufacturer data interaction on the basis of a digital car key. For example, the digital car key registration method provided in the example of the disclosure may be applied to a scenario where the digital car key is created on a terminal, such as a smartphone, and the terminal interacts with a vehicle manufacturer's server to register information related to the digital car key on the vehicle manufacturer's server.

Compared with a traditional mechanical car key for unlocking and starting a car, the digital car key involved in the example of the disclosure may perform operations such as car door unlocking, car door locking, and car starting through terminal devices such as a non-contact type card, an intelligent terminal, and a wearable device with technologies like near field communication. Usually, the digital car key may be provided for the terminal by the vehicle manufacturer's server, and the terminal registers the digital car key to the vehicle manufacturer's server.

In related art, a car owner needs to register the digital car key with a vehicle manufacturer's server when using the digital car key on the intelligent terminal. When the digital car key is registered, registration may be performed on the basis of a user identity to identify the digital car key through the user identity; for example, the digital car key may be shared on the basis of the user identity. At present, when the digital car key is registered on the basis of the user identity, usually, a hash value after a car owner account identity is hashed is used as the user identity. Usually, the hash value is fixed, and a vehicle manufacturer may use this fixed value to associate a plurality of cars purchased by the car owner; that is, related behavior operations of the car owner may be associated, resulting in the personal data leakage of the car owner.

When the terminal registers the digital car key to the vehicle manufacturer's server, a registration request sent to the vehicle manufacturer's server needs to include a user identity, so that the vehicle manufacturer's server may match the digital car key with a car owner through the user identity of the digital car key, so that when the car owner shares the car key in the future, or when the car owner replaces a device in the future, a use situation of the digital car key is not affected.

However, in the related technology, in a car connectivity consortium (CCC), the user identity used in a registration of the digital car key is based on a hash value of a user account identity (account ID) in a mobile phone account system. The hash value of the user account identity is used as the user identity, which may avoid backward derivation of a user account by the vehicle manufacturer, and thus avoid the direct disclosure of the user account. Because the hash value of the user account identity is fixed, the vehicle manufacturer can still match this fixed hash value with a user, which may then be associated with a behavior of the user, resulting in data leakage of personal information of the user. For example, if the user changes a car, or the user has a plurality of cars, the vehicle manufacturer will know that the user has changed the car or has the plurality of cars through the backwards-derived user account.

In an example, the car owner opens the digital car key A on a mobile phone A and registers the key A (insurance requirement) on the vehicle manufacturer's server, and the car owner account identity needs to be brought in the registration request during registration. The car owner shares the digital car key to a friend, creates a shared digital car key B on a mobile phone B of the friend, and registers a digital car key B on the vehicle manufacturer's server. When the car owner changes to a mobile phone C, a digital car key C needs to be created on the mobile phone C, and the digital car key C is registered on the vehicle manufacturer's server. When the vehicle manufacturer's server determines that the car owner account identity has not changed, use of the digital car key B is not affected. When an original car owner sells the car, a new car owner creates a digital car key D on a mobile phone D. When the digital car key D is registered for the vehicle manufacturer's server, the vehicle manufacturer's server finds that the car owner account identity has changed, and the digital car key B shared by the original car owner needs to be cancelled, so the cancelled digital car key B will not be used.

In the included example scenario, the car owner is uniquely identified by the user account identity, so that the car owner shares the digital car key. However, since the user identity is a fixed hash value obtained after the hash operation on the basis of the unique user account identity, the vehicle manufacturer may backwards/reverse derive the unique user account identity through the fixed hash value, and then associate a purchase behavior (purchasing the plurality of cars or changing the car) through the user account identity, resulting in the leakage of personal data of the user.

In view of this, an example of the disclosure provides a digital car key registration method in which a user identity of a digital car key is generated on the basis of a user account identity and other information to avoid the use of a unique user account identity to generate a user identity.

In an example, the other information may be car information. The user identity of the digital car key is generated on the basis of a car owner account identity and the car information, and the digital car key is registered for a vehicle manufacturer's server on the basis of the user identity, so as to prevent a vehicle manufacturer from associating with a user behavior corresponding to a user account and avoid the data leakage of personal information of a user.

A technical solution provided by examples of the disclosure may include the following beneficial effects: the user identity included in the registration request sent by the terminal to the vehicle manufacturer's server is generated on the basis of the car owner account identity and the car information, so that the user identity is associated with the car information and not only the car owner account identity. Furthermore, when requesting the registration of the digital car key from the vehicle manufacturer's server, a vehicle manufacturer cannot be associated with, on the basis of the user identity, a related behavioral action of a car owner corresponding to the car owner account identity, thus improving the confidentiality for a user when the digital car key is registered.

FIG. 1 is a flow diagram of a digital car key registration method shown according to an example. The method is applied to a terminal, and the terminal may be a device such as a mobile phone, a computer, or a tablet. As shown in FIG. 1, the digital car key registration method includes steps S11.

In step S11, a registration request for requesting a registration of a digital car key is sent to a vehicle manufacturer's server, and the registration request includes a user identity generated on the basis of a car owner account identity and car information.

In the example of the disclosure, the car owner account identity, the car information, and the digital car key have a one-to-one correspondence.

In an implementation mode, the digital car key may be the digital car key acquired by an interaction between the terminal and the vehicle manufacturer's server.

The car owner account identity corresponding to the digital car key may be information inputted by a user on the terminal. The car owner account identity may be a mobile phone number, or other identification information inputted by the user to identify a user identity.

The car information corresponding to the digital car key may be car-related information, such as the car identity, a car brand, and other related information. The car information corresponding to the digital car key may be set by the vehicle manufacturer before the car leaves the factory or manufacturer. The terminal may interact with the vehicle manufacturer's server to acquire the car information, or the car information may be input by the user on the terminal on the basis of a car already owned.

In the example of the disclosure, the user identity of the digital car key is generated on the basis of the car owner account identity and the car information, and then the user identity is not only associated with a user account, but also associated with the car information.

In an example, the terminal acquires the car owner account identity and the car information corresponding to the digital car key, and hashes the car owner account identity and the car information to obtain a hash value with a fixed value, and the hash value is used as the user identity of the digital car key.

In the digital car key registration method provided by the example of the disclosure, the registration request sent by the terminal to the vehicle manufacturer's server includes a the user identity generated on the basis of the car owner account identity and the car information, which makes the user identity be associated with the car, then avoid the association of the vehicle manufacturer with a user behavior corresponding to a user account, and avoid the data leakage of personal information of the user.

An implementation process of generating the user identity on the basis of the car owner account identity and the car information is described in the disclosure as provided herein, in combination with practical applications.

In an example, the car information used for generating the user identity in the example of the disclosure may include a car identity (car ID). The car identity is used to uniquely identify a car. For example, the car identity may be a car serial number distributed by the car manufacturer to the car when the car leaves the factory or manufacturer.

Figure 2:
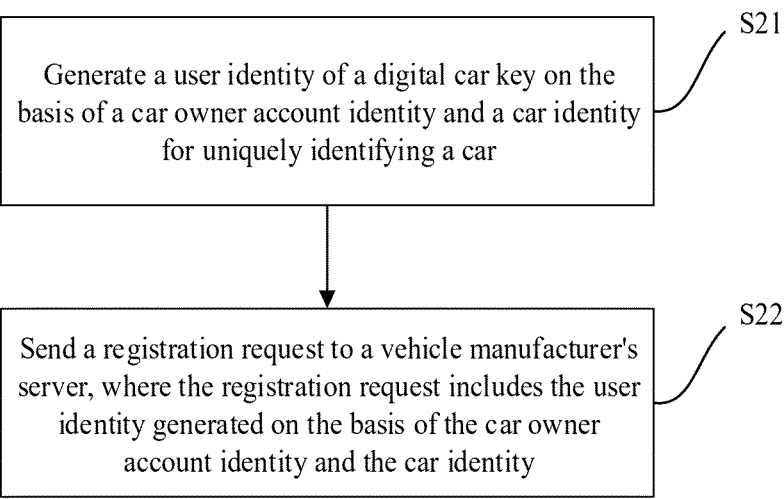
FIG. 2 is a flow diagram of a digital car key registration method shown according to an example.

FIG. 2 is a flow diagram of a digital car key registration method shown according to an example. The method is applied to the terminal. As shown in FIG. 2, the digital car key registration method includes steps S21 and S22.

In step S21, the user identity of the digital car key is generated on the basis of the car owner account identity and the car identity for uniquely identifying the car.

In an example, the terminal may hash the car owner account identity and the car identity to obtain a hash value with a fixed value, and the hash value is used as the user identity of the digital car key.

In step S22, the registration request is sent to the vehicle manufacturer's server and includes the user identity generated on the basis of the car owner account identity and the car identity.

In the example of the disclosure, both a car manufacturer and a terminal manufacturer may uniquely acquire the car identity, so that in a case of consensus between the car manufacturer and the terminal manufacturer, the car identity that uniquely identifies the car is used for generating the user identity. This can prevent the vehicle manufacturer from being associated with the user behavior corresponding to the user account, and avoid the data leakage of the personal information of the user. Additionally, the information interaction between the terminal and the vehicle manufacturer's server is reduced, and a user identity generation process is simplified.

In another example, the car information used for generating the user identity in the example of the disclosure may include a car Brand identity.

In the example of the disclosure, the terminal may hash the car owner account identity and the car brand identity to obtain a hash value with a fixed value, and the hash value is used as the user identity of the digital car key.

Furthermore, in the example of the disclosure, in order to enable the user identity to be uniquely associated with the car and further avoid the leakage of the personal information, the user identity may be generated on the basis of the car owner account identity, the car brand identity, and the car identity.

Figure 3:
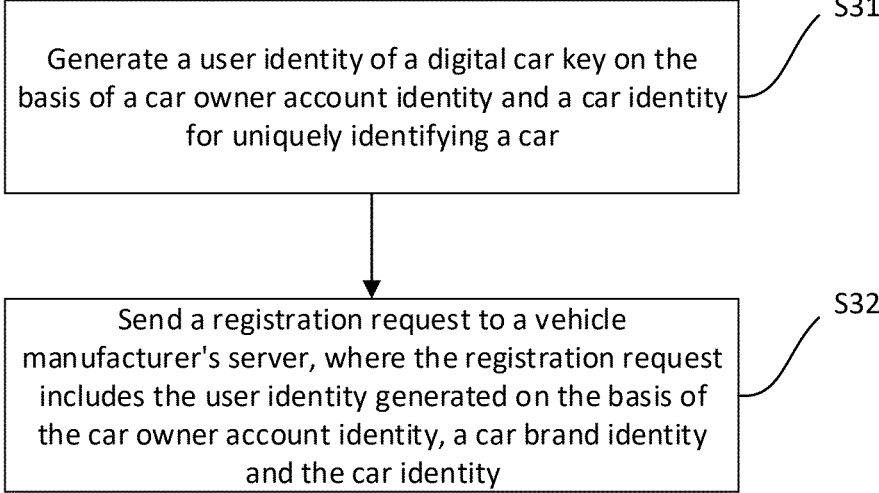
FIG. 3 is a flow diagram of a digital car key registration method shown according to an example.

FIG. 3 is a flow diagram of a digital car key registration method shown according to an example. The method is applied to the terminal, and as shown in FIG. 3, the digital car key registration method includes steps S31 and S32.

In step S31, the user identity of the digital car key is generated on the basis of the car owner account identity, the car brand identity, and the car identity.

In the example of the disclosure, the terminal may hash the car owner account identity, the car brand identity, and the car identity to obtain a hash value with a fixed value, and the hash value is used as the user identity of the digital car key.

In step S32, the registration request is sent to the vehicle manufacturer's server and includes the user identity generated on the basis of the car owner account identity, the car brand identity, and the car identity.

In the example of the disclosure, both the user account identity and the car identity are used for uniquely identifying the user and the car, so that in order to further prevent reversely attacking and breaking the user account identity and the car identity, the car brand identity and the car identity are combined with the user account identity in the example of the disclosure to generate the user identity. This may prevent the vehicle manufacturer from being associated with the user behavior corresponding to the user account, further prevent the user identity from being reverse attacked, and prevent the data leakage of the personal information of the user.

Further, in the example of the disclosure, in order to prevent the car brand identity from being reversely attacked, an identity code that is used for uniquely identifying the car brand identity may be distributed to the car brand identity. The terminal generates the user identity on the basis of the car owner account identity, the identity code that uniquely identifies the car brand identity, and the vehicle identity.

Figure 4:
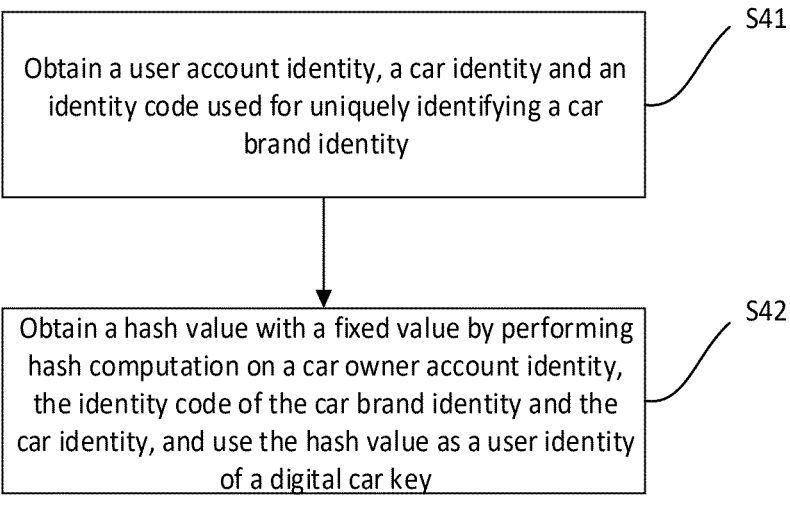
FIG. 4 is a flow diagram of a user identification generation method shown according to an example.

FIG. 4 is a flow diagram of a user identification generation method shown according to an example. The method is applied to the terminal, and as shown in FIG. 4, the digital car key registration method includes steps S41 and S42.

In step S41, the user account identity, the car identity, and the identity code used for uniquely identifying the car brand identity are obtained.

In step S42, the car owner account identity, the identity code of the car brand identity, and the car identity are hashed to obtain a hash value with a fixed value, and the hash value is used as the user identity of the digital car key.

In an example, the terminal performs a hash operation on the basis of the car owner account identity, the identity code that uniquely identifies the car brand identity, and the car identity. Then a hash value with a fixed value is obtained.

In the example of the disclosure, in a digital car key registration method process, the terminal acquires the car owner account identity and the car information of the car identity and/or the car brand identity, and hashes the car owner account identity and the car information to obtain the hash value with the fixed value, and the hash value is used as the user identity of the digital car key and sent to the vehicle manufacturer's server. Since the vehicle manufacturer's server matches the digital car key with the car owner on the basis of the user identity, a use situation of the digital car key will not be affected when the car owner shares the car key in the future, or when the car owner changes the device in the future, and at the same time, the car manufacturer will not be uniquely associated with the user account identity through the user identity, so that the car manufacturer may be prevented from being associated with the user behavior associated with the user account, and leakage of the personal information of the user is avoided.

On the basis of the same conception, an example of the disclosure further provides a digital car key registration method executed by the vehicle manufacturer's server.

Figure 5:
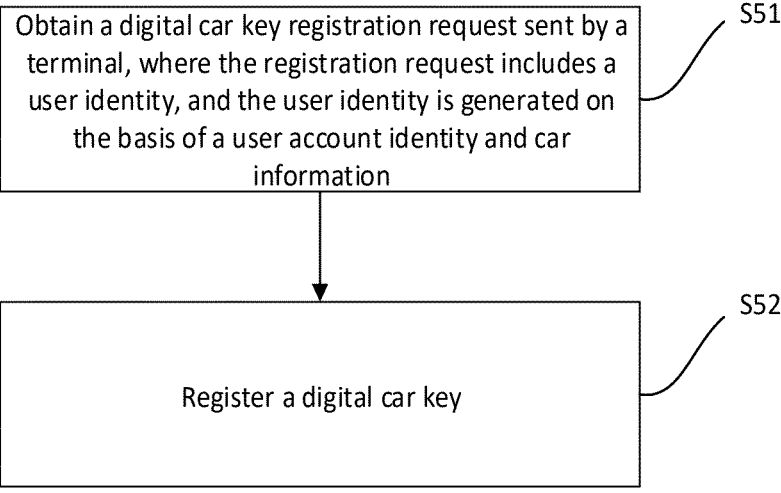
FIG. 5 is a flow diagram of a digital car key registration method shown according to an example.

FIG. 5 is a flow diagram of a digital car key registration method shown according to an example, and the method is applied to the vehicle manufacturer's server. As shown in FIG. 5, the digital car key registration method includes steps S51 and S52.

In step S51, the digital car key registration request sent by the terminal is obtained, the registration request includes the user identity, and the user identity is generated on the basis of the user account identity and the car information.

In step S52, the digital car key is registered.

In the example of the disclosure, the registration request acquired by the vehicle manufacturer's server during the digital car key registration includes the user identity generated on the basis of the car owner account identity and the car information, and then the user identity is associated with the car. Thus, it may prevent the vehicle manufacturer from being associated with the user behavior corresponding to the user account, and may avoid data leakage of the personal information of the user.

In an example, the car information used for generating the user identity in the example of the disclosure may include the car identity. The car identity is used to uniquely identify the car. For example, the car identity can be the car serial number distributed by the car manufacturer to the car when the car leaves the factory or manufacturer.

The user identity may be the hash value with the fixed value obtained after the hash operation on the basis of the car owner account identity and the car identity.

In another example, the car information used for generating the user identity in the example of the disclosure may include the car brand identity.

The user identity may be the hash value with the fixed value obtained after the hash operation on the basis of the car owner account identity and the car brand identity.

Further, in the example of the disclosure, in order to enable the user identity to be uniquely associated with the car and further avoid leakage of the personal information, the user identity may be generated on the basis of the car owner account identity, the car brand identity, and the car identity.

In the example of the disclosure, the car brand identity has the identity code that uniquely identifies the car brand identity, and the user identity is generated on the basis of the car owner account identity, the identity code corresponding to the car brand identity, and the car identity, which may further prevent reversely attacking and breaking the user account identity and the car identity. In an example of the disclosure, the user identity is generated by the car brand identity and the car identity combined with the user account identity, which may prevent the vehicle manufacturer from being associated with the user behavior corresponding to the user account, further prevent the user identity from being reversely attacked, and prevent the data leakage of the personal information of the user.

On the basis of the same conception, an example of the disclosure further provides a digital car key registration apparatus.

It may be understood that in order to implement the included functions, the digital car key registration apparatus provided in the example of the disclosure includes a corresponding hardware structure and/or a corresponding software module executing all the functions. In combination with units and algorithmic steps of each example disclosed in the example of the disclosure, the example of the disclosure may be implemented through hardware or in a form of combining the hardware and computer software. Whether a certain function is performed through hardware or in a mode of the computer software driving the hardware depends on a specific application and design constraints of the technical solution. Those skilled in the art may use different methods for each particular application to implement the described functions, but such implementation is not considered to be beyond the scope of the technical solution of the example of the disclosure.

Figure 6:
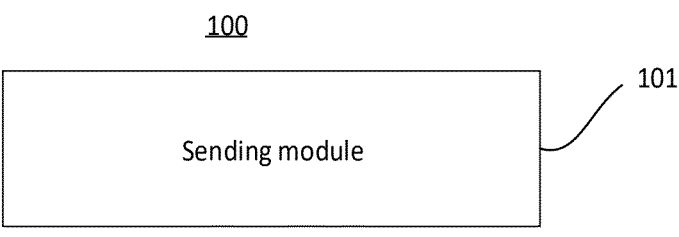
FIG. 6 is a block diagram of a digital car key registration apparatus shown according to an example.

FIG. 6 is a block diagram of a digital car key registration apparatus shown according to an example. Referring to FIG. 6, the digital car key registration apparatus 100 includes a sending module 101.

In an implementation mode, car information acquired by the sending module 101 includes a car identity used for uniquely identifying a car.

In an implementation mode, the car information acquired by the sending module 101 further includes a car brand identity.

In an implementation mode, the user identity acquired by the sending module 101 is generated on the basis of a car owner account identity and the car information by adopting a mode as follows: a hash value with a fixed value is obtained by performing hash computation on the car owner account identity and the car information. The hash value is used as the user identity of the digital car key.

In an implementation mode, the car information acquired by the sending module 101 includes the car brand identity.

The sending module 101 obtains the hash value with the fixed value by performing hash computation on the car owner account identity and the car information by adopting the mode as follows: an identity code used for uniquely identifying the car brand identity is acquired. A hash value with a fixed value is obtained by performing hash computation on the car owner account identity, the identity code, and the car identity.

Figure 7:
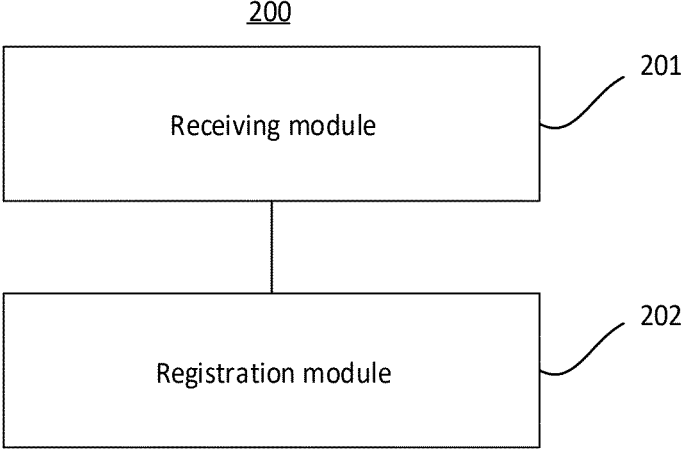
FIG. 7 is a block diagram of a digital car key registration apparatus shown according to an example.

FIG. 7 is a block diagram of a digital car key registration apparatus shown according to an example. Referring to FIG. 7, the digital car key registration apparatus 200 includes a receiving module 201 and a registration module 202.

The receiving module 201 is configured to acquire a digital car key registration request sent by a terminal, the registration request includes a user identity, and the user identity is generated on the basis of a user account identity and car information. The registration module 202 is configured to register a digital car key.

In an implementation mode, the car information includes a car identity used for uniquely identifying a car.

In an implementation mode, the car information further includes a car brand identity.

In an implementation mode, the user identity is generated on the basis of the car owner account identity, an identity code corresponding to the car brand identity, and the car identity.

With respect to the apparatus in the included examples, a specific mode in which each module performs an operation has been described in detail in the examples related to the method and will not be elaborated here.

In order to implement the included examples, the disclosure further provides a computer program, including a computer-readable code, and when the computer-readable code runs on a computational processing device, the computational processing device performs any of the digital car key registration and/or the user identification generation method described herein.

Figure 8:
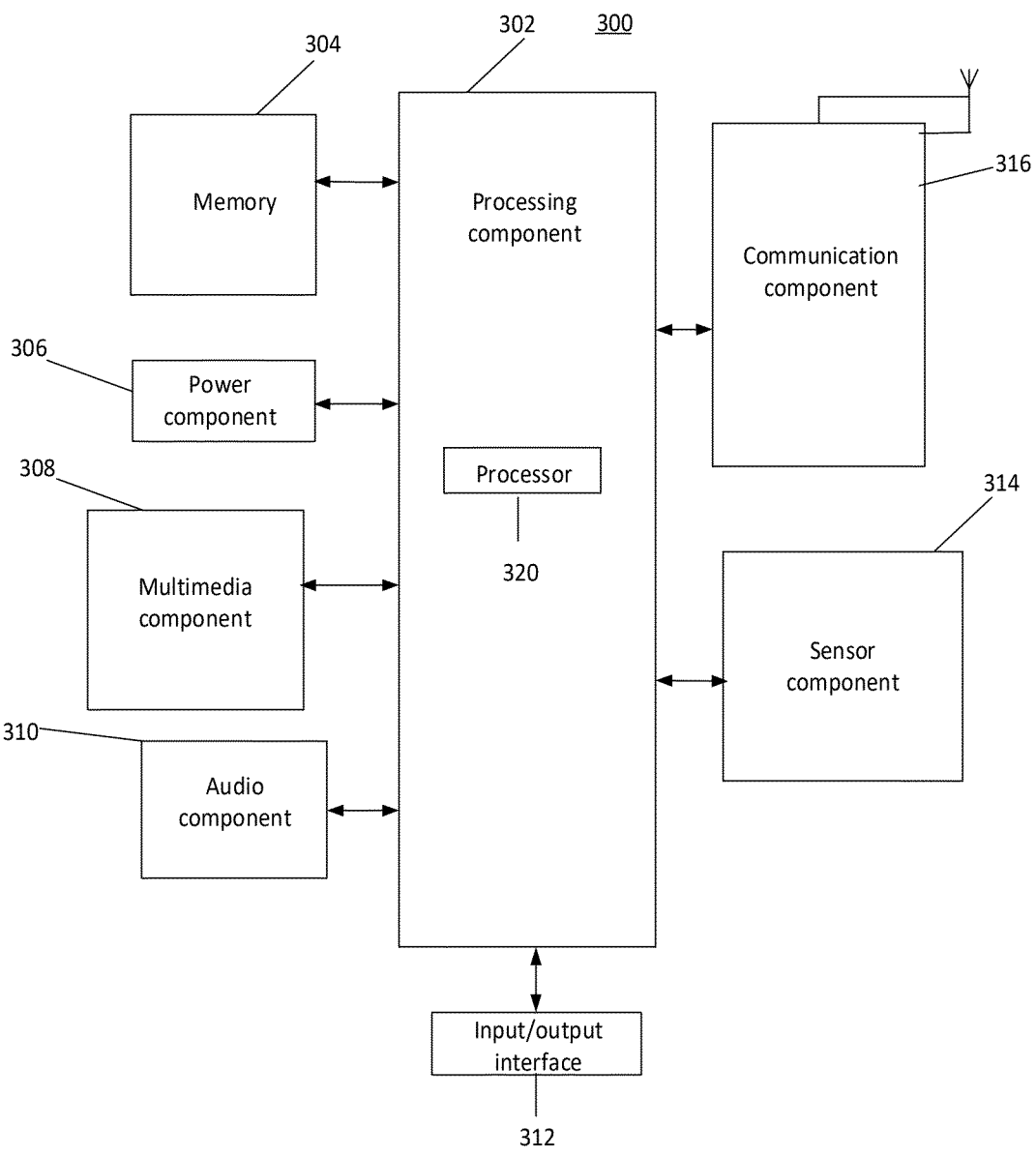
FIG. 8 is a block diagram of an apparatus for a registration of a digital car key shown according to an example.

FIG. 8 is a block diagram of an apparatus 300 for a registration of a digital car key shown according to an example. For example, the apparatus 300 may be a mobile phone, a computer, a digital broadcast terminal, a messaging device, a game console, a tablet device, a medical device, a fitness device, a personal digital assistant, etc.

Referring to FIG. 8, the apparatus 300 may include one or more of the following components: a processing component 302, a memory 304, a power component 306, a multimedia component 308, an audio component 310, an input/output (I/O) interface 312, a sensor component 314, and a communication component 316 communicatively coupled to each other.

The processing component 302 typically controls the overall operation of the apparatus 300, such as operations associated with display, a telephone call, data communication, a camera operation, and a recording operation. The processing component 302 may include one or more processors 320 to execute instructions to complete all or part of the steps of any of the included methods. In addition, the processing component 302 may include one or more modules to facilitate an interaction between the processing component 302 and other components. For example, the processing component 302 may include a multimedia module to facilitate an interaction between the multimedia component 308 and the processing component 302.

The memory 304 is configured to store various types of data to support operations on the apparatus 300. Examples of these data include instructions for any application or method operating on the apparatus 300, contact data, phonebook data, messages, pictures, videos, etc.

The memory 304 may be implemented by any type of volatile or nonvolatile storage device or their combination, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk, or an optical disk.

The power component 306 provides power for various components of the apparatus 300. The power component 306 may include a power management system, one or more power sources, and other components associated with generating, managing, and distributing power for the apparatus 300.

The multimedia component 308 includes a screen providing an output interface between the apparatus 300 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundaries of the touch or sliding action, but also detect the duration and pressure associated with the touch or sliding operation. In some examples, the multimedia component 308 includes a front camera and/or a rear camera. When the apparatus 300 is in an operation mode, such as a shooting mode or a video mode, the front camera and/or the rear camera may receive external multimedia data. Each front camera and each rear camera may be a fixed optical lens system or have a focal length and optical zoom capability.

The audio component 310 is configured to output and/or input audio signals. For example, the audio component 310 includes a microphone (MIC) configured to receive an external audio signal when the apparatus 300 is in the operation mode, such as a call mode, a recording mode, and a speech recognition mode. The received audio signal may be further stored in the memory 304 or transmitted via the communication component 316. In some examples, the audio component 310 further includes a speaker for outputting the audio signals.

The I/O interface 312 provides an interface between the processing component 302 and a peripheral interface module, which may be a keyboard, a click wheel, a button, etc. These buttons may include, but are not limited to, a home button, a volume button, a start button, and a lock button.

The sensor component 314 includes one or more sensors configured to provide state evaluation of various aspects for the apparatus 300. For example, the sensor component 314 may detect an on/off state of the apparatus 300 and the relative positioning of the components, for example, the component is a display and a keypad of the apparatus 300. The sensor component 314 may also detect the change of the position of the apparatus 300 or one component of the apparatus 300, the presence or absence of a user making contact with the apparatus 300, the azimuth or acceleration/deceleration of the apparatus 300, and temperature change of the apparatus 300. The sensor component 314 may include a proximity sensor configured to detect the presence of nearby objects when there is no physical contact. The sensor component 314 may further include an optical sensor, such as a complementary metal-oxide-semiconductor (CMOS) or charge-coupled device (CCD) image sensor, for use in imaging applications. In some examples, the sensor component 314 may further include an acceleration sensor, a gyroscope sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard, such as WiFi, 2G or 3G, or their combination. In an example, the communication component 316 receives a broadcast signal or broadcast-related information from an external broadcast management system via a broadcast channel. In an example, the communication component 316 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the apparatus 300 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements for executing any of the included methods.

In an example, a non-transitory computer-readable storage medium including instructions is further provided, such as the memory 304 including instructions, and the included instructions may be executed by the processor 320 of the apparatus 300 to complete any of the included methods. For example, the non-transitory computer-readable storage medium may be an ROM, a random access memory (RAM), a compact disc read-only memory (CD-ROM), a magnetic tape, a floppy disk, an optical data storage device, etc.

Figure 9:
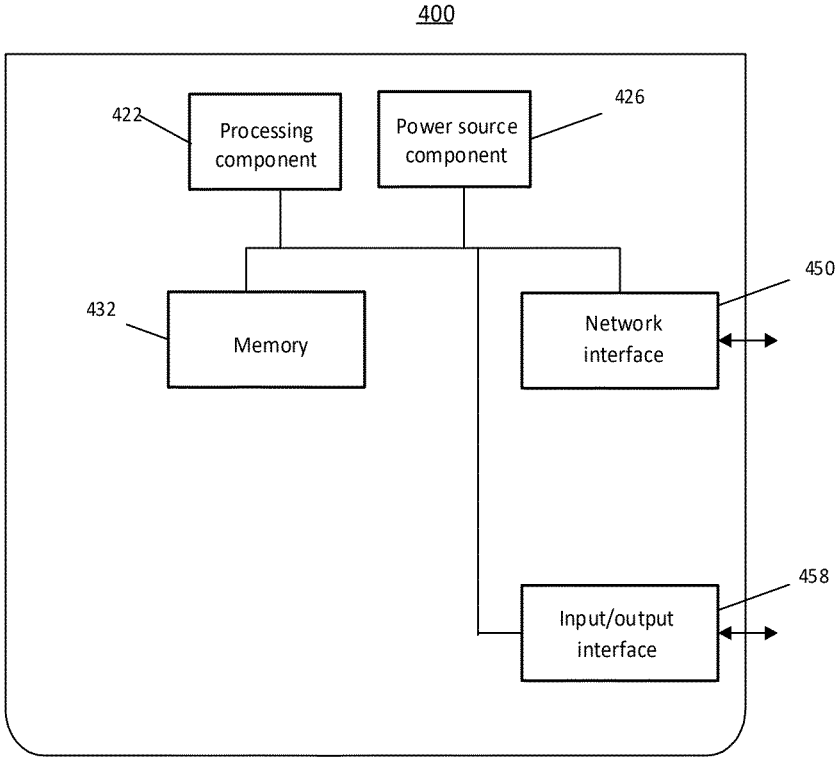
FIG. 9 is a block diagram of an apparatus for a registration of a digital car key shown according to an example.

FIG. 9 is a block diagram of an apparatus 400 for a registration of a digital car key shown according to an example. For example, the apparatus 400 may be provided as a server. Referring to FIG. 9, the apparatus 400 includes a processing component 422, which further includes one or more processors (not shown), and memory resources represented by the memory 432 for storing instructions that may be executed by the processing component 422, such as applications. The applications stored in the memory 432 may include one or more modules, each corresponding to a set of instructions. In addition, the processing component 422 is configured to execute the instructions to execute any of the included methods.

The apparatus 400 may also include a power source component 426 configured to perform power source management for the apparatus 400, a wired or wireless network interface 450 configured to connect the apparatus 400 to a network, and an input/output (I/O) interface 458. The apparatus 400 can operate an operating system based on the memory 432, such as Windows Server™, Mac OS X™, Unix™, Linux™, FreeBSD™, or similar.

In an example, the apparatus 400 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements for executing any of the included methods.

In an example, a non-transitory computer-readable storage medium including instructions is further provided, such as the memory 432 including instructions, and the included instructions may be executed by the processing component 422 of the apparatus 400 to complete any of the included methods. For example, the non-transitory computer-readable storage medium may be an ROM, a random access memory (RAM), a CD-ROM, a magnetic tape, a floppy disk, an optical data storage device, etc. The apparatuses and the included modules of FIGS. 6 and 7 can be performed by the apparatuses of both FIGS. 8 and 9, and have the structure of the apparatuses and components of both FIGS. 8 and 9.

It may be understood that "a plurality" in the disclosure means two or more, and other quantifiers are similar. "And/or" describes an association relationship of associated objects, indicating that there may be three kinds of relationships, for example, A and/or B, may indicate: A exists alone, A and B exist simultaneously, and B exists alone. The character "/" generally indicates that front-and-back associated objects have an "or" relationship. Singular forms of "a", "said", and "the" are also intended to include plural forms, unless the context clearly indicates other meanings.

It may be further understood that terms "first", "second", etc. are used for describing various kinds of information, but such information is not to be limited to these terms. These terms are merely used for distinguishing the same type of information from each other and do not represent a particular sequence or importance. In fact, expressions of "first", "second", etc., may be used interchangeably completely. For example, without departing from the scope of the disclosure, first information may also be referred to as second information, and similarly, the second information may also be referred to as the first information.

It may be further understood that in the example of the disclosure, although the operations are described in a particular order in the accompanying drawings, the operations are not construed as being performed in a particular or serial order as shown, or that all operations shown are performed to obtain a desired result. In certain environments, multitasking and parallel processing may be advantageous.

Those skilled in the art will easily think of other implementation solutions of the disclosure after considering the specification and practicing the disclosure disclosed here. The present application is intended to cover any variations, uses, or adaptations of the disclosure, and these variations, uses, or adaptations follow the general principles of the disclosure and include common knowledge or customary technical means in the technical field not disclosed in the disclosure.

It is to be understood that the disclosure is not limited to an exact structure that has been described herein and illustrated in the accompanying drawings, and various modifications and changes may be made without departing from its scope. The scope of the disclosure is merely limited by the appended claims.

The invention claimed is:

1. A digital car key registration method, performed by a terminal, and comprising:

sending, to a server, a registration request for requesting a registration of a digital car key, wherein the registration request comprises a user identity of the digital car keys;

wherein the user identity is generated based on a car owner account identity and car information by adopting a mode as follows:

obtaining a hash value with a fixed value by performing hash computation on the car owner account identity and the car information; and using the hash value as the user identity of the digital car key.

2. The method according to claim 1, wherein the car information comprises a car identity used for uniquely identifying a car.

3. The method according to claim 2, wherein the car information comprises a car brand identity.

4. The method according to claim 1, wherein the car information comprises a car brand identity; and obtaining the hash value with the fixed value by performing the hash computation on the car owner account identity and the car information comprises:

obtaining an identity code used for uniquely identifying the car brand identity, and obtaining the hash value with the fixed value by performing hash computation on the car owner account identity, the identity code and the car identity.

5. The method according to claim 1, wherein the car owner account identity, the car information and the digital car key being uniquely corresponding to each other.

6. A digital car key registration method, performed by a server, and comprising:

acquiring a digital car key registration request sent by a terminal, wherein the registration request comprises a user identity; and registering a digital car keys;

wherein the user identity is generated based on a car owner account identity and car information by adopting a mode as follows:

obtaining a hash value with a fixed value by performing hash computation on the car owner account identity and the car information; and using the hash value as the user identity of the digital car key.

7. The method according to claim 6, wherein the car information comprises a car identity used for uniquely identifying a car.

8. The method according to claim 7, wherein the car information comprises a car brand identity.

9. The method according to claim 8, wherein the user identity is generated based on a car owner account identity, the car identity and an identity code corresponding to the car brand identity.

10. A digital car key registration apparatus, comprising: one or more processors; and a memory configured to store processor executable instructions;

wherein the processor executable instructions, when executed by the one or more processors, cause the digital car key registration apparatus to:

send, to a server, a registration request for requesting a registration of a digital car key, wherein the registration request comprises a user identity of the digital car keys;

wherein the user identity is generated based on a car owner account identity and car information by adopting a mode as follows:

obtain a hash value with a fixed value by performing hash computation on the car owner account identity and the car information; and use the hash value as the user identity of the digital car key.

11. A digital car key registration apparatus, comprising: one or more processors; and a memory configured to store processor executable instructions;

wherein the processor executable instructions, when executed by the one or more processors, cause the digital car key registration apparatus to perform the digital car key registration method according to claim 6.

12. A non-transitory computer-readable storage medium, wherein the non-transitory computer-readable storage medium stores instructions, and a terminal is enabled to execute a digital car key control method according to claim 1 in response to determining that the instructions in the non-transitory computer-readable storage medium are executed by one or more processors of the terminal.

13. A non-transitory computer-readable storage medium, wherein the non-transitory computer-readable storage medium stores instructions, and a server is enabled to execute a digital car key control method according to claim 6 in response to determining that the instructions in the non-transitory computer-readable storage medium are executed by one or more processors of the server.

14. A non-transitory computer program, comprising non-transitory computer-readable storage medium, wherein a computational processing device is caused to execute the digital car key registration method according to claim 1 in response to determining that the non-transitory computer-readable storage medium runs on the computational processing device.

15. The apparatus according to claim 10, wherein the car information comprises a car identity used for uniquely identifying a car.

16. The apparatus according to claim 15, wherein the car information comprises a car brand identity.

17. The apparatus according to claim 10, wherein the car information comprises car brand identity; and obtain the hash value with the fixed value by performing hash computation on the car owner account identity and the car information comprises:

obtain an identity code used for uniquely identifying the car brand identity; and obtain the hash value with the fixed value by performing hash computation on the car owner account identity, the identity code and the car identity.

18. The apparatus according to claim 10, wherein the car owner account identity, the car information and the digital car key being uniquely corresponding to each other.

* * * * *